(12) United States Patent
Janardhanan (10) Patent No.: US 9,800,508 B2
(45) Date of Patent: Oct. 24, 2017

(54) SYSTEM AND METHOD OF FLOW SHAPING TO REDUCE IMPACT OF INCAST COMMUNICATIONS

(71) Applicant: DELL PRODUCTS L.P., Round Rock, TX (US)

(72) Inventor: Pathangi Narasimhan Janardhanan, Santa Clara, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 65 days.

(21) Appl. No.: 14/593,335

(22) Filed: Jan. 9, 2015

(65) Prior Publication Data

US 2016/0205023 A1 Jul. 14, 2016

(51) Int. Cl.
*H04L 12/26* (2006.01)
*H04L 12/815* (2013.01)
*H04L 12/801* (2013.01)
*H04L 12/825* (2013.01)
*H04L 12/835* (2013.01)

(52) U.S. Cl.
CPC ............ *H04L 47/22* (2013.01); *H04L 47/12* (2013.01); *H04L 47/26* (2013.01); *H04L 47/30* (2013.01)

(58) Field of Classification Search
None
See application file for complete search history.

(56) References Cited

U.S. PATENT DOCUMENTS

| | | | |
|---|---|---|---|
| 9,172,651 B2* | 10/2015 | Zhang | |
| 9,369,408 B1* | 6/2016 | Raghavan | H04L 49/557 |
| 9,450,884 B2* | 9/2016 | Hwang | H04L 47/70 |
| 2008/0062876 A1* | 3/2008 | Giroux | H04L 12/2856 370/235 |
| 2011/0211449 A1* | 9/2011 | Attar | H04L 47/10 370/235 |
| 2012/0092995 A1* | 4/2012 | Arvidsson | H04L 47/10 370/235 |
| 2012/0140621 A1* | 6/2012 | Wu | H04L 69/163 370/230 |
| 2013/0124753 A1* | 5/2013 | Ansari | H04L 47/263 709/235 |
| 2013/0215750 A1* | 8/2013 | Beecroft | H04L 47/11 370/235 |
| 2014/0247718 A1* | 9/2014 | Mogul | H04L 49/9084 370/230 |
| 2014/0376383 A1* | 12/2014 | McCormick | H04L 47/2441 370/238 |

(Continued)

OTHER PUBLICATIONS

Ren, et al.; A Survey on TCP Incast in data center networks, International Journal of Communication Systems, 2012, (19 pages), wileyonlinelibrary.com.

*Primary Examiner* — Bob Phunkulh
(74) *Attorney, Agent, or Firm* — Haynes & Boone, LLP (57) ABSTRACT

A system and method includes a network device comprising a control unit, a first port coupled to the control unit and configured to couple the network device to a first device using a first network link. The control unit is configured to receive a data packet from the first device on the first port, inspect the data packet for an indicator of an incast communication pattern, and implement a data flow shaper on a network when the indicator is present in the data packet.

20 Claims, 4 Drawing Sheets

(56) References Cited

U.S. PATENT DOCUMENTS

| | | | |
|---|---|---|---|
| 2015/0016247 A1* | 1/2015 | Hayes | H04L 47/127 370/230 |
| 2015/0124615 A1* | 5/2015 | Spector | H04L 47/22 370/235 |
| 2015/0124809 A1* | 5/2015 | Edsall | H04L 45/74 370/390 |
| 2015/0180769 A1* | 6/2015 | Wang | H04L 45/38 370/236 |
| 2015/0188808 A1* | 7/2015 | Ghanwani | H04L 45/586 709/244 |
| 2015/0236968 A1* | 8/2015 | Zhang | H04L 63/1416 370/230 |
| 2016/0105343 A1* | 4/2016 | Janarthanan | H04L 43/0876 370/252 |
| 2016/0205041 A1* | 7/2016 | Lee | H04L 45/38 709/226 |

* cited by examiner

SYSTEM AND METHOD OF FLOW SHAPING TO REDUCE IMPACT OF INCAST COMMUNICATIONS

BACKGROUND

The present disclosure relates generally to information handling systems, and more particularly devices, systems, and methods for incast alleviation.

As the value and use of information continues to increase, individuals and businesses seek additional ways to process and store information. One option is an information handling system (IHS). An IHS generally processes, compiles, stores, and/or communicates information or data. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling many types of communication and information, which is constantly growing. Making this possible is a vast array of network switching products that make forwarding decisions in order to deliver packets of information from a source system or first network node to a destination system or second network node. Recently a lot of applications have been developed to analyze large data sets, sometimes referred to as "big data." These types of applications often request large sets of data distributed over several databases and/or clusters of computers. Because data requests based on these types of applications request data from several sources in parallel, a data transfer bottleneck occurs at the receiving edge switch, end system, and/or the requesting end device. The edge switch, end system, and/or end device will buffer the data it receives beyond its throughput, but once that buffer capacity is exceeded, the edge switch, end system, and/or end device will begin to drop packets. This situation is often referred to as the "incast" problem.

Accordingly, it would be desirable to have a system, methods, and products that can aid in alleviating incast problems by distributing the buffer load over multiple devices.

SUMMARY

According to an exemplary embodiment, a network device includes a control unit a first port coupled to the control unit and configured to couple the network device to a first device using a first network link. The control unit is configured to receive a data packet from the first device on the first port, inspect the data packet for an indicator of an incast communication pattern, and implement a data flow shaper on a network when the indicator is present in the data packet.

According to another exemplary embodiment, a network device includes a control unit, a port coupled to the control unit and configured to couple the network switching device to a first device using a network link. The network device includes a non-transitory computer readable medium with instructions that, when executed by the control unit, causes the control unit to receive a data packet from the first device on a first port, inspect the data packet for an indicator of an incast communication pattern, and implement a data flow shaper on a network when the indicator is present in the data packet.

According to another exemplary embodiment, a method of incast alleviation by distributed buffering implemented by a central control includes receiving a data packet from a first device, inspecting the data packet for an indicator of an incast communication pattern for a data transmission, and implementing a data flow shaper on a network when the indicator is present in the data packet.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
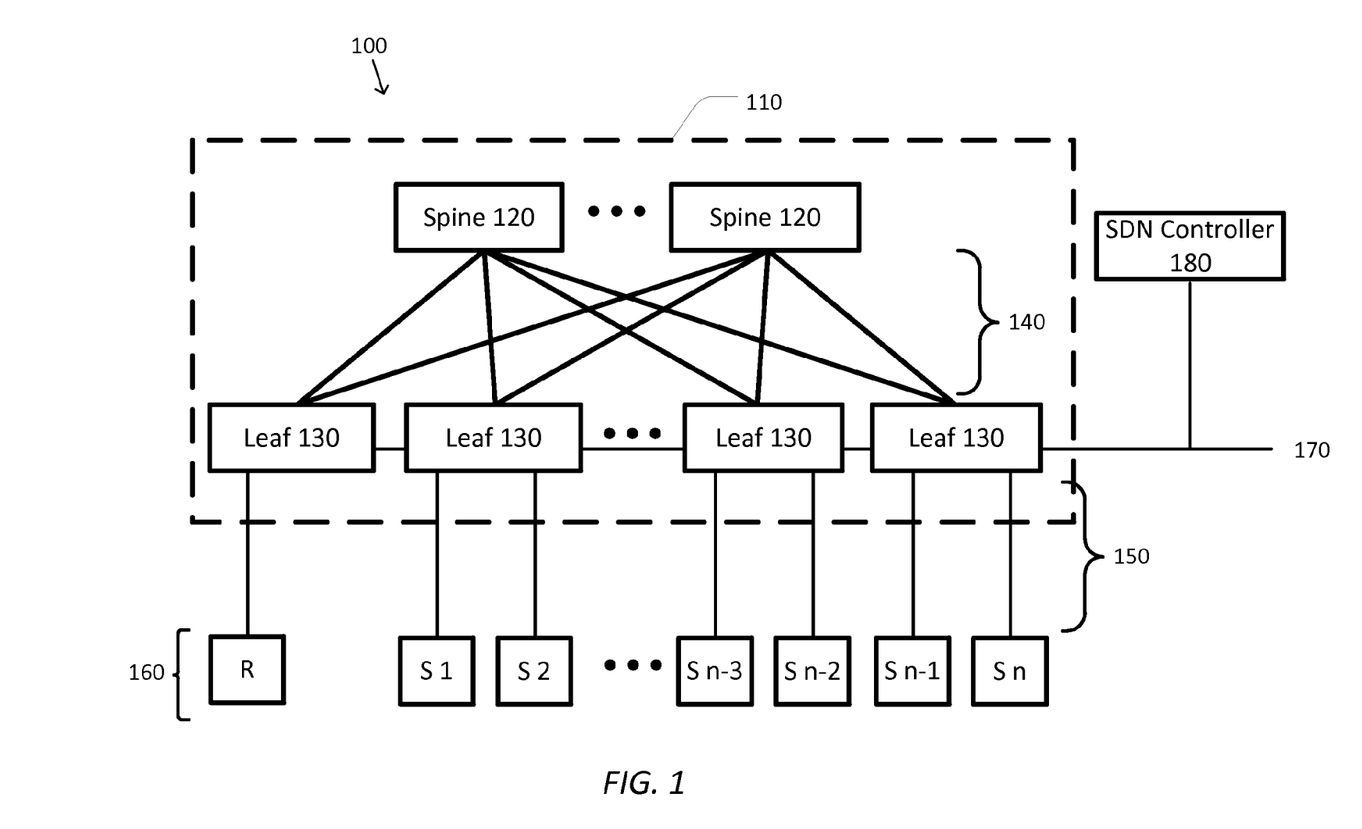
FIG. 1 shows a simplified diagram of a network for enabling connectivity between devices according to some embodiments.

FIG. 1 shows a simplified diagram of a network 100 according to some embodiments. As shown in FIG. 1, network 100 is configured around a multi-tier architecture that may be suitable for use with many data centers. In some embodiments, other topologies, such as Clos and Fat Tree topologies, may be used for network 100. In some examples, network 100 may be configured around a two-tier switching fabric 110. Switching fabric 110 includes a plurality of switches to implement the interconnections between other switches and/or network devices in network 100. More specifically, the plurality of switches in switching fabric 110 is separated into switches that perform one of two roles. A first one or more of the switches are spine switches 120, a second one or more of the switches are leaf switches 130. The spine switches 120 are used to interconnect the leaf switches 130 using a collection of interlinks 140 so that network traffic received at any one of the leaf switches 130 may be forwarded to any other of the leaf switches 130 by traveling through only one of the spine switches 120. As a consequence, network traffic may move between any two leaf switches 130 using at most two hops and can cross the switching fabric 110 using only those two hops. Although only a single interlink 140 is depicted between each of the spine switches 120 and each of the leaf switches 130, one of ordinary skill in the art would understand that there may be multiple interlinks 140 between any pair of spine switches 120 and leaf switches 130. In some examples, because spine switches 120 serve as a major hop between leaf switches 130, spine switches 120 may have faster data transfer rates on link towards the leaf switches. For example, each of the spine switches 120 may have data transfer rates of 40 or 100 gigabits per second (Gbps) towards the leaf switches, while each of the leaf switches 130 may have 1 or 10 gigabit per second (Gbps) data transfer rates, towards the end systems 160, which may be a server, switch, and/or another end device.

In some examples, the network 100 may use the switching fabric 110 to interconnect other switches and/or network devices that are related to a data center. In some examples, the leaf switches 130 may each include one or more downlinks 150 that couple the leaf switches 130 to one or more switches and/or network devices in the network 100, which can then be the TOR switches. Although only spine switches 120 and leaf switches 130 are shown, it would be understood that the leaf switches 130 may connect to any type of network device that is part of the network 100 or the corresponding data center such as a server. Although only a single downlink 150 is depicted between any end system 160 and leaf switches 130, one of ordinary skill in the art would understand that there may be multiple downlinks 150 between any one of the end systems 160 and any one of the leaf switches 130. In some examples, each of the leaf switches 130 may further include one or more uplinks 170 that couple the network 100 to network devices in other networks. Although only one uplink 170 is depicted, one of ordinary skill in the art would understand that the uplinks 170 may couple the leaf switches 130 to multiple networks and may include more than one uplink connection. According to some embodiments, the network traffic throughout the network 100 may be managed by using a management controller such as an exemplary software defined networking (SDN) controller 180 used in network 100. SDN controller 180 may be partially separated from the network switching devices and connected to one or more of the network switching devices 120, 130, and 160 through uplink 170 and/or another connection such as interlinks 140 and/or downlinks 150. In some examples, SDN controller 180 may be used to provide centralized management of the network switches and control the data flow within network 100. In some examples, the centralized management and control may be obtained by selecting one or more of the network switching devices 120, 130, and/or 160 as the SDN controller.

In some examples, end system 160R may request data and/or be on the receiving end of a data request from several of end systems 160S1-160Sn. In some examples, several of end systems 160S1-160Sn may send data to end system 160R simultaneously. In some embodiments, end system 160R may have limited bandwidth over the corresponding downlink 150 for receiving the requested data and the leaf switch 130 connected to end system 160R may have to buffer the data. In some embodiments, the data sent by end systems 160S1-Sn may overload the buffer of the leaf switch 130 connected to end system 160R. In some embodiments, SDN controller 180 may recognize the overload of a leaf switch 130 and/or end system 160R and implement a data flow shaper. In some embodiments, SDN controller 180 may identify data requests and/or data transfer requests that would create an overloaded leaf switch 130, spine switch 120, and/or other switches in the network and implement a data flow shaper. In some examples SDN controller 180 may implement a data flow shaper by constricting the data transfer rates and/or bandwidth of one or more switches 120, 130 and/or other switches for a particular data request and/or data transfer request. In some example a data flow shaper implemented by SDN controller 180 may reroute data to use additional switch hops.

Many different types of network traffic may move within or across network 100. Network traffic with different properties, characteristics, and/or features may be directed and/or forwarded by the network switching devices in network 100, such as SDN controller 180. In some examples, when each of the network switching devices desires to forward and/or direct network traffic within or across network 100, the characteristics of the network traffic, the intervening network switching devices, and/or the intervening network links may be considered. In some examples, one or more network switching devices account for and use a number of intervening network links or next hops when directing and/or forwarding network traffic. In some examples, a throughput, latency of the intervening network switching devices and/or network links may be considered. In some examples, the buffer size and/or availability of the intervening network switching devices may be considered. In some examples, a desired quality of service (QoS) may be considered. In some examples, congestion in the intervening network switching devices and/or network links may be considered. In some examples, the data flow patterns may be considered, such as whether a many-to-one data flow pattern is or about to occur. In some examples, multiple criteria may be considered in making the forwarding decision. In general, though, the forwarding decision is made in a distributed and local fashion where each network switching device along the path makes a forwarding decision based on forwarding information available at that network switching device.

Users and/or applications using network 100 for forwarding network traffic have many different protocols available for providing limited management over forwarding behavior in the network 100. In some examples, protocols such as virtual private networks (VPNs) and Internet Protocol Security (IPSec) may be used to encrypt network traffic that is forwarded in network 100. In some examples, virtual routing and forwarding (VRF) may be used to create multiple versions of forwarding information tables (e.g., the one or more forwarding information tables 230) so that network traffic using different address sets may be forwarded using different strategies. In some examples, QoS and the Resource Reservation Protocol (RSVP) may be used to emphasize different network traffic characteristics that may affect the forwarding decisions made by the network switching devices and/or central controller.

According to some embodiments, each of these protocols may provide a limited ability to handle different subsets of network traffic based on the different needs, characteristics, and/or features of each of the different subsets. In some examples, the different handling may be accomplished through special designations in packets of the network traffic. In some examples, additional protocol headers and/or encapsulation may be used to implement the special designations. In some examples, a source network device and a destination network device may coordinate to determine the special designations. In some examples, the network traffic may still be forwarded within or through network 100 subject to the distributed and local forwarding decisions made by each of the network switching devices. These distributed and local forwarding decisions may often provide a practical way for a network with large numbers of network switching devices to handle large quantities of very different network traffic. However, localized management and control of network traffic may not always result in good overall forwarding decisions for the network as a whole. In some examples, with localized management, failures, changes, and/or congestion in one part of the network may not be considered in another part of the network and may result in very inefficient use of the network and/or losses of large quantities of network traffic. Thus the use of a central controller, such as SDN controller 180 may be used to help control or completely control network traffic. One or more network switching devices within a network 100 may inform the central controller of new data flows occurring within the network. The central controller, having an overview of the data flows within the network, may be able control data traffic flows by instructing one or more network switching devices to direct data traffic to certain switch hops, changing data transfer rates, changing QoS settings, changing forwarding decisions, changing data packet priorities, and/or the like. Because the SDN controller gets reports of data flows from the switches within network 100, the SDN controller 180 may use the reports to identify bottlenecks in data traffic, overloaded switches, data requests that will cause incast communication problems, and/or the like. The SDN controller 180 may then institute data traffic decisions based on the data traffic information of multiple switches.

Figure 2:
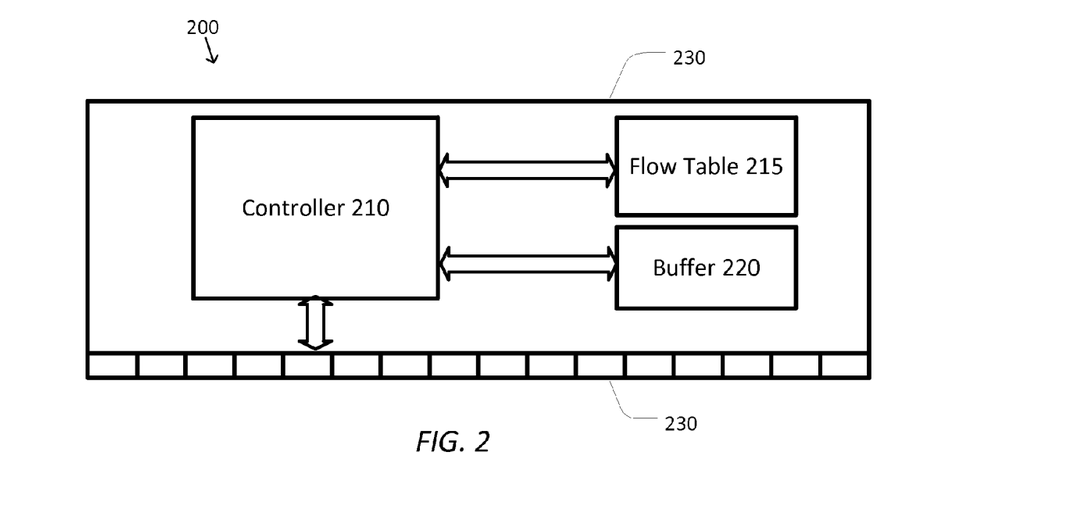
FIG. 2 shows a simplified diagram of a switch according to some embodiments.

FIG. 2 shows a simplified diagram of a network switching device 200 according to some embodiments. In some embodiments network switching device 200 (also referred to as "switch 200") may be used for one or more spine switches 120, leaf switches 130, and/or end systems 160 of FIG. 1. As shown in FIG. 2, the network switching device 200 includes a control unit 210, flow table 215, and buffer 220. In some examples, the control unit 210 may include one or more processors and machine readable memory (not shown). The control unit 210 may be coupled to the buffer 220 and flow table 215. Control unit 210 may control the operation of the switch 200, which may include, but is not limited to, conducting deep packet inspection, limiting bandwidth and/or data transmission rates, flow shaping, routing of data packets, sending and receive data packets, buffering and/or the like. In some examples, the control unit 210 may be used to make forwarding decisions for network traffic being handled by the switch 200 based on flow table 215. Control unit 210 may include one or more processors, central processing units, microprocessors, microcontrollers, multi-core processors, field programmable gate arrays (FPGAs), application specific integrated circuits (ASICs), and/or the like.

In some examples, the control unit 210 may maintain and/or update the flow table 215. In some examples, flow table 215 may include tables, such as virtual LAN (VLAN) tables, media access control (MAC) tables, layer 3 (L3) tables, layer 3 forwarding information bases, access control lists (ACLs), flow processing (FP) tables, and the like. Flow table 215 may contain next destination and/or routing information for data packets. In some embodiments, a central controller, such as SDN controller 180 of FIG. 1 may update flow table 215 and or provide data routing instructions to control unit 210. In some examples, flow table 215 may be stored in memory coupled with the network switching device 200 and/or the control unit 210. In some examples, flow table 215 may be implemented using data structures other than tables and/or using databases.

The switch 200 further includes one or more ports 230 for coupling the switch 200 to other switches and/or network devices using network links, such as interlinks 140, downlinks 150, and uplink 170. In some examples, the control unit 210 may use one or more protocols to communicate with the other switches and network devices using the one or more ports 230 and network links.

Buffer 220 may include one or more types of machine readable media. Some common forms of machine readable media may include floppy disk, flexible disk, hard disk, magnetic tape, any other magnetic medium, RAM, FLASH-EPROM, any other memory chip or cartridge, and/or any other medium from which a processor or computer is adapted to read. Buffer 220 may be used to store/buffer data packets that are being received. In some examples buffer 220 may buffer data packets when data is received on one or more ports 230 faster than controller 120 can process. Buffer 220 may also buffer out-going data. In some examples buffer 220 may buffer data when controller 120 is able to provide data packets for sending out faster than the bandwidth and/or data transfer rates of one or more ports 230. In some examples, buffer 220 may buffer data when controller 120 processes data faster than a restricted data transfer rate for a particular data transmission. In some examples, the restricted data transfer rate may be an instruction from a central controller, such as SDN controller 180 of FIG. 1. Buffer 220 may have limited space, and once full, buffer 220 may drop received packets and/or ignore data transfer rates limited by a central controller.

Figure 3:
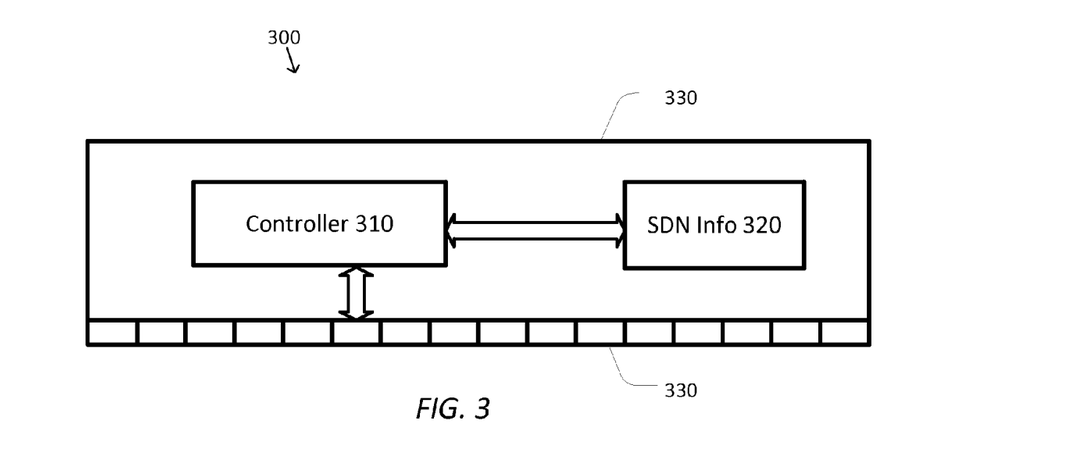
FIG. 3 shows a simplified diagram of a central controller according to some embodiments.

FIG. 3 is a simplified diagram of a SDN managing server 300 according to some embodiments. As shown in FIG. 3, the SDN managing server 300 may be similar to the network switching device 200 of FIG. 2, but the SDN managing server 300 includes SDN information 320. In some examples, the SDN managing server 300 may be the SDN controller 180 of FIG. 1. In some examples, the SDN information 320 may include one or more data structures for recording information related to a network such as network 100 of FIG. 1. In some examples, the SDN information 320 may be stored in memory coupled with the SDN managing server 300 and/or the controller 310. Using the SDN information 320, the SDN managing server 300 may provide management and control over network traffic throughout the network. In some examples, the network may have a single SDN managing server 300, such as SDN controller 180 as shown in FIG. 1, but more than one SDN managing server 300 may also be used.

According to some embodiments, the SDN managing server 300 may provide flow control messages and/or flow processing messages to the other network switching devices, such as spine switches 120, leaf switches 130, and/or other switches, within the network system. In some examples, the flow control messages may include data transfer rates and buffering instructions for network traffic packets that meet certain criteria. For example, SDN managing server 300 may send data transfer rate instructions to one or more switches for application on data flows related to Hadoop® application data requests. In some examples, the flow control messages may include processing, buffering, flow shaping, and/or forwarding instructions for data packets that meet certain criteria. The certain criteria may include packets being directed to a certain port, IP address, IP source, and/or the like. The certain criteria may also include recognizing communication protocols, data packet signatures for certain applications, data packet signatures that cause incast data transmission patterns, and/or the like.

In some embodiments, the flow control messages may include next hop instructions for when a switch has overloaded buffers and/or for when a switch receives data packets directed to certain data requests. In some examples, the flow control messages may be flexible and include instructions based on complex packet matching and/or filtering considerations.

In some embodiments, the flow control messages may modify one or more forwarding information tables of a switch, such as flow tables 215 of FIG. 2. The network switching devices may identify incoming data packets meeting one or more criteria of the forwarding tables and then forward the packets according to the corresponding forwarding instructions. In some examples, the flow control messages may be compatible with OpenFlow™. OpenFlow™ is a communications protocol that allows remote administration of the packet forwarding tables on switches and/or routers.

In general, SDN provides only a framework for centralized management and control devices that make up a network and/or part of a network. In some examples, SDN may only be used to provide a static configuration for the network as specified during provisioning of the network. In some examples, SDN may be used manually by a researcher to configure the network for a particular experiment.

Figure 4:
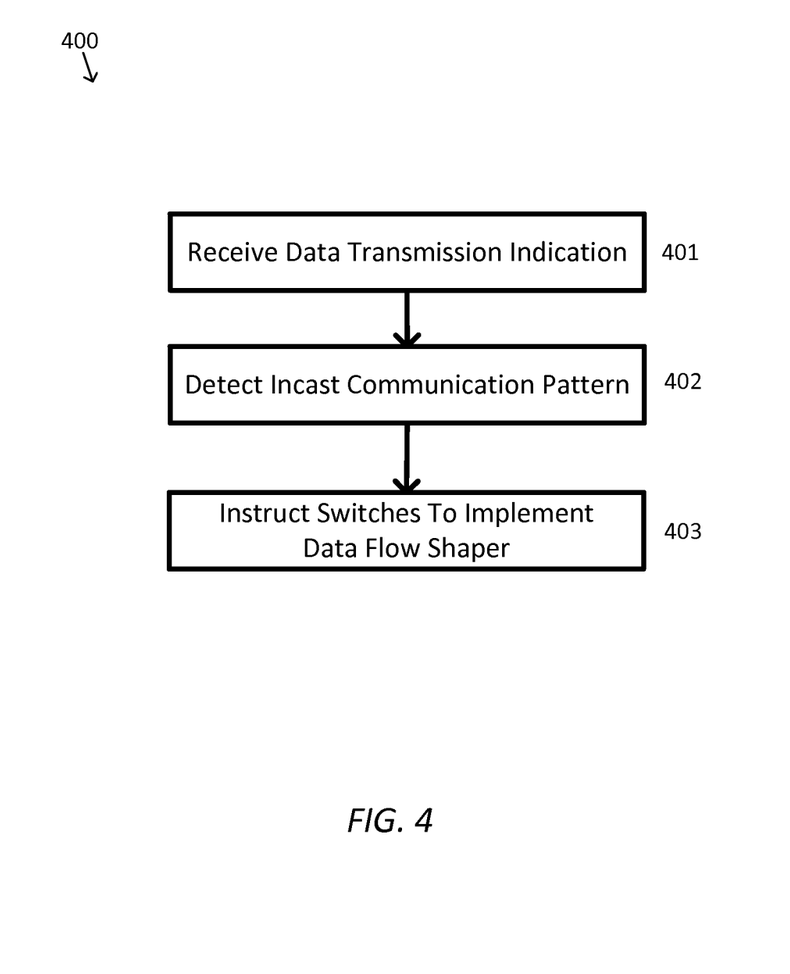
FIG. 4 shows a flow chart illustrating an exemplary method that may be included in a method of distributed buffering for incast communication patterns according to some embodiments.

FIG. 4 is a flow chart illustrating a method 400 of incast alleviation by distributing buffer loads over multiple network devices. The method may be implemented by a central controller, such as SDN controller 180 of FIG. 1, and/or other network switching devices or combination of network switching devices. The method may include process 401 wherein an indication of a data transmission may be received. In some embodiments, the data transmission indication may be a one or more data packets, and/or part of one or more data packets. In some examples, the data transmission indication may be a new data flow report to the central controller from a networking device, such as any of spine switches 120, leave switches 130, end systems 160, and/or SDN controller 180. In some embodiments, the data transmission indication may be a copy of a data packet and/or part of a data packet being switched and/or routed by one or more networking devices and received from one of the one or more network devices in one or more messages. In some embodiments the data transmission indication may be sent by one or more switches connected the central controller.

At process 402, a determination may be made, based on the received data transmission indication, whether an incast communication pattern will occur. In some embodiments, process 402 may identify incast communication patterns by monitoring the data transmissions that involve multiple senders to a single receiver. In some embodiments, process 402 may search for data transmissions that will create data flows involving multiple devices simultaneously sending data transmissions to a single edge device, an end system, a single edge switch, and/or single leaf switch.

In some examples, process 402 may conduct deep packet inspection on data packets for indicators that a data transmission will result in an incast communication pattern. Deep packet inspection may be performed by looking at the internal headers and/or bodies of the messages, packets, and/or datagrams included in a data packet for specific types of header field types and/or values as well as payload patterns. In some examples, the deep packet inspection may include examining the headers and bodies of layer 4 (e.g., Transmission Control Protocol (TCP)) and layer 5 (e.g., application) packets and/or datagrams. In some examples, process 402 may conduct deep packet inspection and search for communication protocols that are recognized as causing incast communication patterns and/or multiple sender to single receiver data flow patterns. For example, process 402 may search for signatures of internet small computer system interface ("iSCSI") data transfers, fiber channel over Ethernet ("FCoE") data transfers, and/or other communication protocols within a data packet that are notorious for creating incast communications patterns.

Signatures of such communication protocols may be identified through destination internet protocol ("IP") addresses, source IP addresses, port numbers, and/or the like. For example, iSCSI data requests often use port numbers 860 and 3260. Process 402 may conduct deep packet inspection to determine whether one of these ports are being used by the data packet.

In some embodiments, process 402 may conduct deep packet inspection to determine if an application known to create incast communication patterns is involved with a data transmission. For example, many large scale data processing applications, big data applications, and/or programs that use parallel distributed algorithms (e.g. MapReduce) are known to cause incast communication patterns for data requests. Hadoop®, for example, is one such application. Process 402 may identify whether a data request is related to an application based on destination IP addresses, source IP addresses, port numbers, and/or the like. For example, Hadoop® data transfer requests often uses port numbers 50070, 50074, and 50030. Process 402 may detect incast communication patterns by conducting deep packet inspection on data packets in search of port numbers related to an application known to cause incast communication patterns.

Additionally, deep packet inspection may be used to identify data requests to storage networks. For example, the Hadoop® distributed file system ("HDFS") uses a NameNode server as a file locator and iSCSI uses SCSI target names to identify data storage arrays. Process 402 may use deep packet inspection to search for node names that are often related applications which cause many-to-one and/or incast communication patterns.

In some embodiments, process 402 may monitor data flows for multiple senders sending data to a single destination. For example, process 402 may monitor destination IP addresses and source IP addresses for several data packets and tally the number of different servers and/or switches sending data to a single destination IP address. When the number of servers and/or switches sending data to a single IP address crosses a threshold, process 402 may recognize that an incast communications pattern is occurring. In some examples, process 402 may inspect data packets for multicast and/or broadcast data requests.

At process 403, a data flow shaper may be implemented for data transmissions that process 402 detected as causing incast communication patterns. In some examples of implementing a data flow shaper, method 400 may instruct switches to reduce bandwidth and/or data transfer speeds for any data going to a particular IP address. A data flow shaper may be instituted by instructing each of the switches along the path of a data transmission to reduce data transfer speeds, and/or to buffer received data that overflows the data transfer speeds. In some examples, each of the switches may be instructed by sending one or more flow control and/or flow shaping messages to the switches.

In some examples, one or more switches may be instructed to return to maximum data transfer speeds when the buffer for that switch is overloaded. In this manner, data packets are only dropped at the end device, end system, and/or an edge switch. In some embodiments, when the buffer for a switch is overloaded, process 403 may edit the flow tables of the switch to add a hop to one or more additional switches. In this manner additional buffer capacity is added through the additional switch(es) used for a data flow.

Figure 5:
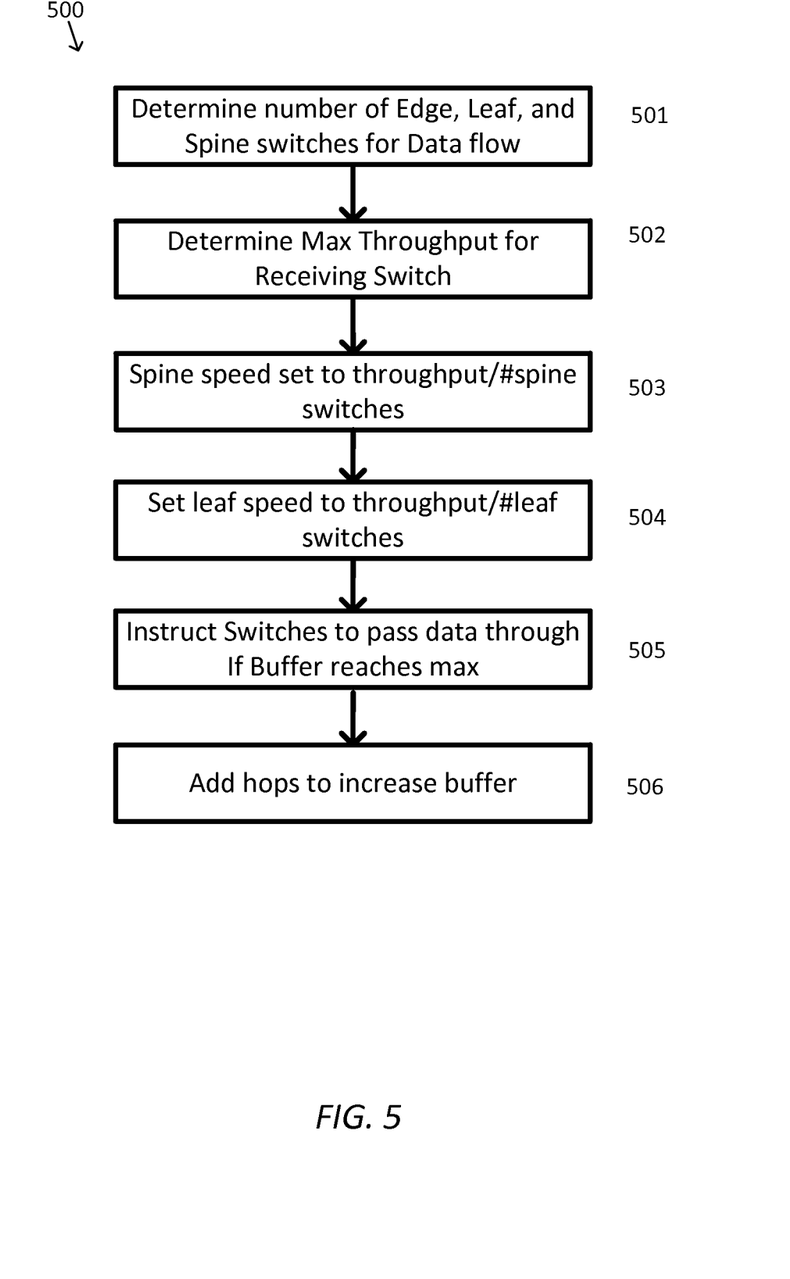
FIG. 5 shows a flow chart illustrating an exemplary method of implementing a data flow shaper according to some embodiments.

FIG. 5 shows a flow chart illustrating a method 500 of implementing an exemplary flow shaper. For example, method 500 may be implemented as part of process 403 of FIG. 4.

At process 501, the number of switches and types of switches that are involved in a pattern of data flows resulting in an incast pattern is determined. A central controller, such as a SDN controller, may be able to determine the number of data flows based on the source and destination IP addresses of one or more data packets that are related to each of the data flows. The IP addresses may be retrieved through a deep packet inspection.

At process 502, the maximum transfer rate and/or throughput of the end and/or leaf switch receiving and/or requesting data may be determined. In some examples, a request is sent for the maximum data throughput of the switch. In some embodiments, process 502 may determine the data throughput of a switch from the specifications for the switch. In some embodiments, the throughput of a switch may be provided by a user and/or administrator.

At process 503, the data transfer rate of all the spine switches are set for the data flows the spine switches are handling based on the number of spine switches used in the pattern of data flows determined at process 501 and/or the maximum data transfer speed of an end or leaf switch determined at process 502. In some embodiments, the data transfer rate may be the maximum speed determined at process 502 divided by the number of spine switches involved in the pattern of data flows. For example, if the maximum data transfer rate is 10 Gbps and there are two spine switches involved, the maximum data transfer rate for each spine switch may be set at 10 Gbps/2 or 5 Gbps.

At process 504, the data transfer rate of leaf switches that are receiving data to be forwarded to the receiving switch may be constricted. In some embodiments, the data transfer rate set for each leaf may be based on the maximum data transfer rate of the receiving switch. In some embodiments, the data transfer rate of the leaf switches may be set to the maximum data transfer rate determined at process 502 divided by the number of leaf switches sending data. For example, if the maximum data transfer rate is 10 Gbps and there are 10 leaf switches forwarding data, the data flow rate of each of the leaf switches may be set at 10 Gbps/10 or 1 Gbps for data that is part of the pattern of data flows. In some examples, the data transfer rate of the leaf switches may be dependent on the number of leaf switches connected to a particular spine switch and the transfer rate of the spine switch. For example, if there were 10 leaf switches connected to a spine switch, where the spine switch has a restricted data rate of 5 Gbps, the data transfer rate set for the leaf switches may be 5 Gbps/10, or 0.5 Gbps.

At process 505, all switches may be instructed to stop restricting data flow when the buffer for the switch overflows or reaches capacity. For example, a switch that is capable of 10 Gbps data transfer rate, with a 10 Megabyte of buffer, and restricted to a 1 Gbps data transfer rate may ignore the 1 Gbps data transfer rate restriction once the 10 Megabyte buffer is filled or reaches a configurable percentage of its capacity, such as 80%.

At process 506, the data flow tables of one or more switches in a data flow may be edited to add switch hops when the buffer of the switch reaches capacity. For example, if a leaf switch transferring data has its buffer overloaded, the leaf switch may add a hop to another leaf switch unused in the data flow. The added switch may also be instructed to have a reduced data transfer rate until its buffers are overloaded similar to the overloaded switch. In this manner, an additional buffer can be used for buffering the data flow.

As discussed above and further emphasized here, FIG. 5 is merely an example which should not unduly limit the scope of the claims. One of ordinary skill in the art would recognize many variations, alternatives, and modifications. In some embodiments, the transfer rates for a spine switch may depend on the number of data flows that the spine switch is handling. In some embodiments, the data transfer rates for a spine switch may be calculated by multiplying the maximum throughput of the receiving device by the number of flows handled by the spine switch divided by the total number of flows handled by all spine switches. In this manner, spine switches may have their data rates reduced proportionally to the number of data flows the spine switch is handling.

Some embodiments one or more switches, central controllers, and/or other networking devices may include non-transient, tangible, machine readable media that include executable code that when run by one or more processors may cause the one or more processors to perform the processes of the methods described above. Some common forms of machine readable media that may include the processes described above are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A network device, comprising:
    a control unit;
    a first port coupled to the control unit and configured to couple the network device to a first device using a first network link;
    the control unit configured to:
        receive one or more first data packets from the first device on the first port;
        inspect the one or more first data packets for an indicator of an incast communication pattern; and
        in response to detecting the indicator, determine a maximum throughput at which a first switch may transfer data and send one or more flow shaping instructions to a second switch of a plurality of switches, the one or more flow shaping instructions causing the second switch to reduce a transmission speed of one or more second data packets being forwarded by the second switch toward the first switch based on the maximum throughput.

2. The network device of claim 1, wherein the control unit is configured to inspect the one or more first data packets for the indicator of the incast communication pattern by searching for a port number in the one or more first data packets by conducting deep packet inspection on the one or more first data packets.

3. The network device of claim 1, wherein the one or more flow shaping instructions further cause the second switch to reduce data transfer rates to a fraction of the maximum throughput.

4. The network device of claim 1, wherein the one or more flow shaping instructions further cause the second switch to reduce data transfer rates to the maximum throughput divided by a number of spine switches forwarding network traffic associated with the incast communication pattern.

5. The network device of claim 1, wherein the one or more flow shaping instructions further cause the second switch to reduce data transfer rates to the maximum throughput divided by a number of leaf switches forwarding network traffic associated with the incast communication pattern.

6. A network device, comprising:
    a control unit;
    a port coupled to the control unit and configured to couple the network device to a first device using a network link;
    a non-transitory computer readable medium with instructions that, when executed by the control unit, causes the control unit to:
        receive a first data packet from the first device on the port;
        inspect the first data packet for an indicator of an incast communication pattern; and
        in response to detecting the indicator, determine a maximum throughput at which a first switch may transfer data and send one or more flow shaping instructions to a second switch of a plurality of switches, the one or more flow shaping instructions causing the second switch to reduce a transmission speed of one or more second data packets being forwarded by the second switch toward the first switch based on the maximum throughput.

7. The network device of claim 6, wherein the one or more flow shaping instructions further cause the second switch to buffer data for a data transfer related to transmission of one or more of the one or more second data packets.

8. The network device of claim 6, wherein the control unit is further configured to divert data traffic to a third switch of the plurality of switches when a buffer of the second switch reaches a configurable capacity.

9. The network device of claim 6, wherein the one or more flow shaping instructions further cause the second switch to increase the transmission speed of the one or more second data packets being forwarded by the second switch when buffers for the plurality of switches reach a configurable capacity.

10. The network device of claim 6, wherein the one or more flow shaping instructions further cause the second switch to reduce data transfer rates to a fraction of the maximum throughput.

11. The network device of claim 6, wherein the one or more flow shaping instructions further cause the second switch to reduce data transfer rates to the maximum throughput divided by a number of spine switches forwarding network traffic associated with the incast communication pattern.

12. The network device of claim 6, wherein the one or more flow shaping instructions further cause the second switch to reduce data transfer rates to the maximum throughput divided by a number of leaf switches forwarding network traffic associated with the incast communication pattern.

13. A method of incast alleviation, comprising:
    receiving a first data packet from a first device;
    inspecting the first data packet for an indicator of an incast communication pattern for a data transmission; and
    in response to detecting the indicator, determining a maximum throughput at which a first switch may transfer data and sending one or more flow shaping instructions to a second switch of a plurality of switches, the one or more flow shaping instructions causing the second switch to:
        reduce a transmission speed of one or more second data packets being forwarded by the second switch toward the first switch based on the maximum throughput; and
        increase the transmission speed of the one or more second data packets being forwarded by the second switch when buffers for the plurality of switches reach a configurable capacity.

14. The method of claim 13, wherein inspecting the first data packet for an indicator of an incast communication pattern includes searching for a port number related to an application that causes incast communication patterns.

15. The method of claim 14, wherein the application that causes incast communication patterns is an application that utilizes a parallel distributed algorithm.

16. The method of claim 13, wherein the one or more flow shaping instructions further cause the second switch to buffer data associated with one or more of the one or more second data packets.

17. The method of claim 13, wherein the one or more flow shaping instructions further cause the second switch to reduce data transfer rates to the maximum throughput divided by a number of leaf switches used in the data transmission.

18. The method of claim 13, wherein the one or more flow shaping instructions further cause the second switch to reduce data transfer rates to the maximum throughput divided by a number of spine switches forwarding network traffic associated with the incast communication pattern.

19. The method of claim 13, wherein the one or more flow shaping instructions further cause the second switch to reduce data transfer rates to a fraction of the maximum throughput.

20. The method of claim 13, further comprising diverting data traffic to a third switch of the plurality of switches when a buffer of the second switch reaches capacity.

* * * * *